(12) United States Patent
Cheng et al.

(10) Patent No.: US 9,468,055 B2
(45) Date of Patent: Oct. 11, 2016

(54) LED CURRENT CONTROL

(75) Inventors: Wai-Keung Cheng, Union City, CA (US); Son Tran, San Jose, CA (US)

(73) Assignee: ALPHA AND OMEGA SEMICONDUCTOR INCORPORATED, Sunnyvale, CA (US)

( * ) Notice: Subject to any disclaimer, the term of this patent is extended or adjusted under 35 U.S.C. 154(b) by 443 days.

(21) Appl. No.: 13/280,151

(22) Filed: Oct. 24, 2011

(65) Prior Publication Data

US 2013/0099684 A1    Apr. 25, 2013

(51) Int. Cl.
*H05B 37/02*        (2006.01)
*H05B 33/08*        (2006.01)

(52) U.S. Cl.
CPC ...... *H05B 33/0827* (2013.01); *H05B 33/0818* (2013.01); *H05B 37/02* (2013.01); *Y02B 20/347* (2013.01)

(58) Field of Classification Search
CPC .......... H05B 33/0821; H05B 33/0839; H05B 33/08; H05B 37/02
USPC ............ 315/308, 312, 185 R, 191–193, 291, 315/307, 360
See application file for complete search history.

(56) References Cited

U.S. PATENT DOCUMENTS

| | | | | |
|---|---|---|---|---|
| 6,798,152 | B2 * | 9/2004 | Rooke ................ | H05B 33/0815 315/209 R |
| 7,202,608 | B2 | 4/2007 | Robinson et al. | |
| 7,301,288 | B2 * | 11/2007 | Green ................ | H02M 3/1588 315/224 |
| 7,358,681 | B2 * | 4/2008 | Robinson ........... | H05B 33/0815 315/224 |
| 7,746,300 | B2 * | 6/2010 | Zhang ................ | H05B 33/0818 315/291 |
| 7,777,704 | B2 * | 8/2010 | S et al. ............ | 345/82 |
| 7,880,404 | B2 * | 2/2011 | Deng ................ | H05B 33/0812 315/224 |
| 8,169,161 | B2 * | 5/2012 | Szczeszynski ..... | H05B 33/0815 315/185 R |
| 8,410,716 | B2 * | 4/2013 | Yao et al. ......... | 315/291 |
| 2005/0225259 | A1 * | 10/2005 | Green ............... | H02M 3/1588 315/224 |

(Continued)

FOREIGN PATENT DOCUMENTS

CN     101010649 B     10/2013

OTHER PUBLICATIONS

On Semiconductor 'SWITCHMODE Power Supply' Reference Manual, Rev. 3B, Jul. 2002.*

(Continued)

*Primary Examiner* — Tung X Le
(74) *Attorney, Agent, or Firm* — Joshua D. Isenberg; JDI Patent

(57) ABSTRACT

Parallel light emitting diode channels may be controlled using a pulsed control signal input characterized by an input duty cycle and one or more current sense input signals. Each of the one or more current sense input signals is indicative of a current through a corresponding load channel of one or more load channels. One or more pulsed channel current control signals are provided to one or more corresponding dimming controls correspondingly coupled to the one or more load channels. Each of the dimming controls is configured to provide an output signal to a corresponding ON-OFF switch, each of which is coupled in series with a corresponding the load channels. The channel duty cycle of each channel current control signal is adjusted relative to the input duty cycle in response to the current sense input signals.

23 Claims, 7 Drawing Sheets

(56) References Cited

U.S. PATENT DOCUMENTS

| | | | | |
|---|---|---|---|---|
| 2007/0257861 | A1* | 11/2007 | Zhang | H05B 33/0818 345/46 |
| 2008/0189539 | A1* | 8/2008 | Hsu | 713/2 |
| 2009/0108776 | A1* | 4/2009 | Zhao | H05B 33/0812 315/307 |
| 2009/0187925 | A1* | 7/2009 | Hu et al. | 719/327 |
| 2009/0189539 | A1* | 7/2009 | Deng et al. | 315/294 |
| 2009/0230874 | A1 | 9/2009 | Zhao et al. | |
| 2009/0230891 | A1* | 9/2009 | Zhao | H05B 33/0815 315/308 |
| 2010/0090755 | A1* | 4/2010 | Ng et al. | 327/543 |
| 2010/0264836 | A1* | 10/2010 | Godbole | 315/185 R |
| 2011/0084619 | A1* | 4/2011 | Gray | H05B 33/0824 315/185 R |
| 2011/0248648 | A1* | 10/2011 | Liu | G09G 3/3406 315/294 |
| 2011/0316090 | A1* | 12/2011 | Chang et al. | 257/379 |
| 2012/0007512 | A1* | 1/2012 | Kim | H05B 33/0827 315/152 |
| 2014/0225531 | A1* | 8/2014 | Cai et al. | 315/307 |
| 2014/0253090 | A1* | 9/2014 | Sangam et al. | 323/351 |

OTHER PUBLICATIONS

On Semiconductor SWITCHMODE Power Supply reference Manual, Rev. 3B, Jul. 2002.*

Cypress Semiconductor Corporation, Document No. 001-46319, Rev. H, Revised Sep. 2009.*

Cypress Semiconductor Corporation, Document No. 001-46319 Rev. H, Revised Sep. 2009.*

Cypress Semiconductor Corporation, Document No. 001-46319 Rev. H, Sep. 17, 2009.*

Alpha & Omega Semiconductor, "High Voltage LED Driver IC," AOZ1977 datasheet, [Revised May 2012].

Taiwanese Office Action for TW Application No. 0223779875, dated Aug. 25, 2014.

* cited by examiner

LED CURRENT CONTROL

FIELD OF THE INVENTION

This invention relates in general to controlling multiple channels of light emitting diodes (LEDs) and in particular to the boost converter to drive multiple channels of LEDs using average current balance.

BACKGROUND OF THE INVENTIONS

Increasingly, many industrial, commercial, and public infrastructure applications have utilized light emitting diodes for lighting. Compared with previous lighting techniques such as incandescent or fluorescent lighting, LEDs can provide, a broad color spectrum, compact size, increased energy efficiency, absence of mercury and related environmental concerns, increased operating life, ability to dim output, absence of infrared or ultraviolet spectral components (when desired), and low voltage (on a per LED basis).

The emergence of high brightness light emitting diodes (HB-LEDs) may have improved aspects of solid state lighting solutions, which may provide performance advantages over conventional lighting technology. Higher optical efficiency, long operating lifetimes, wide operating temperature range and environmentally friendly implementation may be some of the key advantages of LED technology over incandescent or gas discharge light source solutions. However, manufacturing variations in forward voltage drop, luminous flux output, and/or peak wavelength may necessitate binning strategies, which may result in relatively lower yield and increased cost. Furthermore, a large number of LEDs, with matched characteristics, arranged in a suitable optical housing, may be required to meet the desired optical and luminance performance requirements. Dimming requirements and the need for circuit compensation techniques to regulate light output over a range of temperatures, and lifetime of the hardware may render a resistor biased drive solution obsolete for modern LED.

Various circuit techniques based on switching and linear regulating devices may have been described for driving a single "string" of series LEDs with precise forward current regulation and pulse modulation based dimming techniques. Such architectures may require a dedicated drive circuit for each LED string, and therefore may not be suitable for controlling a large number of strings.

It is within this context that embodiments of the present invention arise.

BRIEF DESCRIPTION OF THE DRAWINGS

Other objects and advantages of the invention will become apparent upon reading the following detailed description and upon reference to the accompanying drawings in which.

DESCRIPTION OF THE SPECIFIC EMBODIMENTS

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.
Introduction Conventional LED backlight drivers typically include a boost or buck converter element that supplies the LED bias voltage and a current regulator element that controls the LED current. The driver may adjust the current in response to a control input, which may include a dimming or light level command. The driver may process the control input to provide coordinated responses by the boost or buck and current regulator elements. Inefficiencies may be reduced at least in part by performing phase shifted pulse width modulation (PS-PWM) of the LED strings, which may eliminate pulsed currents from the converter output, and may provide dynamic bus voltage regulation for improved efficiency.

There are generally two conventional methods that are used currently as described in FIGS. 1, 2 and 3 as follows.

Figure 1:
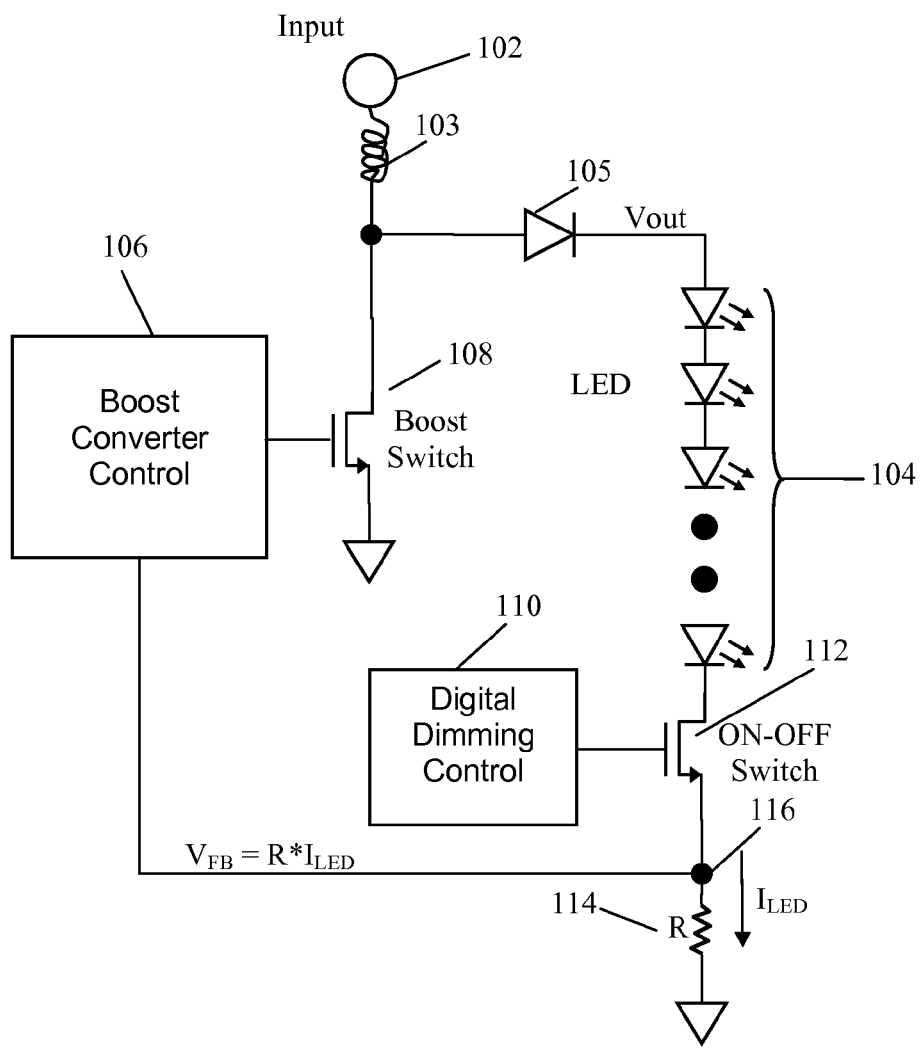
FIG. 1 is a schematic diagram of a conventional system capable of regulating a single channel (or string) of LEDs.

FIG. 1 is a schematic diagram showing a conventional LED driver system 100 capable of regulating a single channel (or string) of LEDs. Such a system may be used to control a bank of LEDs designed for an LED backlight. The system 100 may include a power source 102 coupled to a single channel of LEDs 104 through an inductor 103 and a Schottky diode 105. The power source 102 is through the inductor 103 and a boost switch 108 to ground (or some other voltage reference). The boost switch 108 is a "throttle" type switch in which the instantaneous current through the switch depends on the level of an output signal from a Boost Converter Control 106. Current flows through the inductor 103 when the boost switch 108 is turned on, thereby building up voltage. When the boost switch is off energy stored in the inductor 103 is dumped through a Schottky diode to the LED channel 104.

The system 100 may also include a digital dimming control 110 coupled to LED channel 104 through an ON-OFF switch 112 and a current sense resistor 114 located between the ON-OFF switch 112 and ground, which also is coupled to the boost converter control 106. Because the sense resistor is in series with the LED channel 104, the voltage across the sense resistor 114 is proportional to the current through the sense resistor 114, which is the current ($I_{LED}$) through the LED channel 104. In the system 100, the boost voltage across the LED channel 104 is regulated by controlling the current through the boost switch 108 in response to a voltage measured across the sense resistor 114. The average LED current ($I_{LED}$) is regulated in response to a signal from the dimming control 110. The ON-OFF switch 112 between the sense resistor 114 and the cathode of lowest LED turns the current through the LED channel 104 on and off in response to signals from the dimming control 110. The dimming control 110 adjusts the average current by changing the duty cycle with which the ON-OFF switch 112 turns the current on and off.

The system 100 may implement one control loop to regulate the LED bias voltage $V_{LED}$ at the node 116. A feedback circuit is formed by coupling the LED bias voltage $V_{LED}$ (node 116) back to the boost converter control 106 as a feedback voltage $V_{FB}$ ($V_{FB}=R*I_{LED}$) to implement boost voltage regulation. Due to mismatch of the forward voltages between different LED's, this method is typically used for a single LED channel. This technique is based on use of an individual boost converter control, so for a multi-channel LED system, for example two LED channels, the technique would require two inductors, two boost switches and two ON-OFF switches. Such a system can be undesirably expensive due to the multiple boost switches for boost converter and multiple buck switches for buck converter for each channel.

Figure 2:
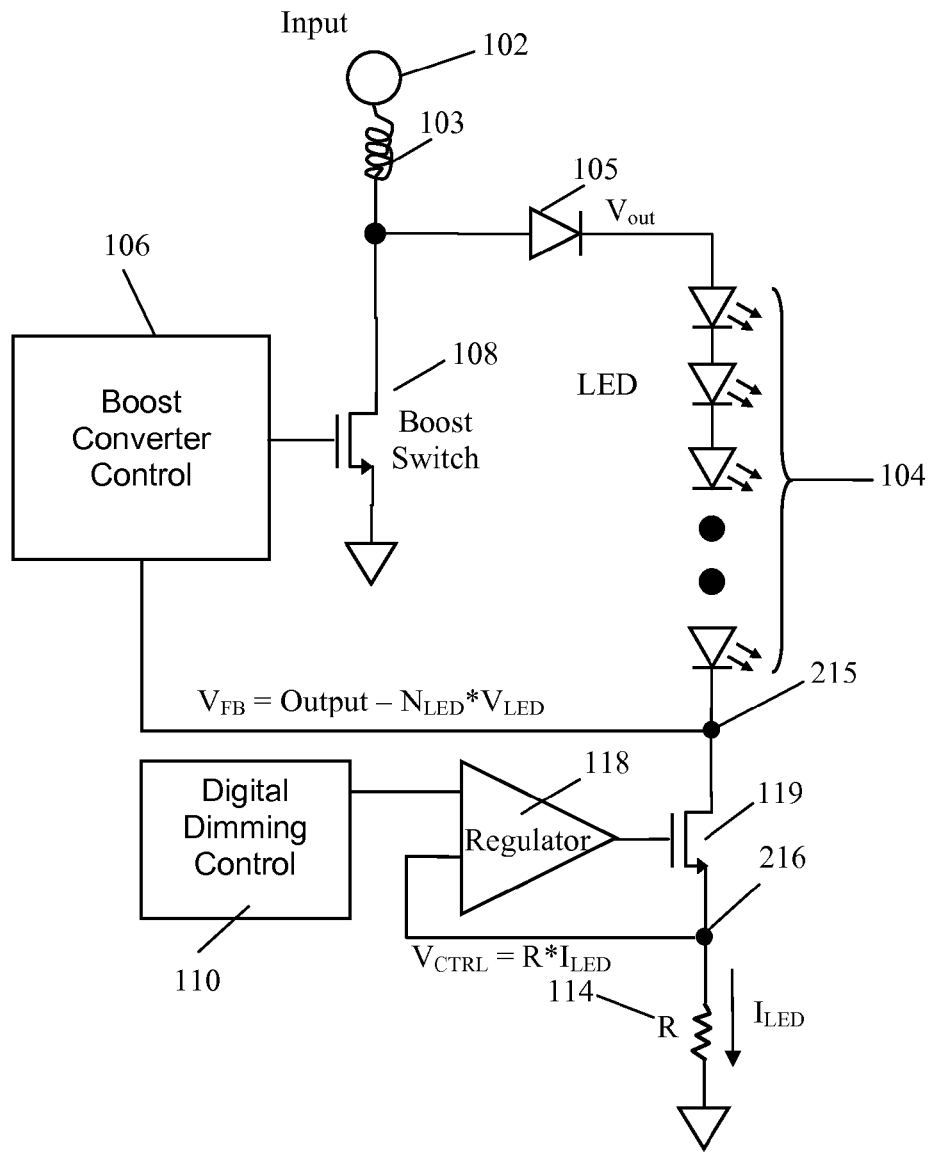
FIG. 2 is a schematic diagram of another conventional system capable of regulating a single channel of LEDs.

FIG. 2 is a schematic diagram showing a conventional boost converter 200 capable of regulating a single channel (or string) of LEDs. Similar to system 100, system 200 may include a power source 102 coupled to a single channel of LEDs 104 through an inductor 103 and a Schottky diode 105. The power source 102 also is coupled through a boost switch 108 to ground or some other voltage reference. In system 200, the boost voltage is regulated in response to a feedback voltage $V_{FB}$, which is measured at the cathode of the lowest LED diode in the channel 104 at node 215.

In this method, the system 200 implements a first control loop to regulate the Output voltage across the LED channel 104 in response to the feedback voltage at the node 215. If the voltage drop across each LED is assumed to be the same, the feedback voltage $V_{FB}$ may be expressed as Output−$N_{LED}*V_{LED}$, where $N_{LED}$ is the number of LEDs in channel 104. A feedback circuit is formed by coupling the feedback voltage $V_{FB}$ at node 215 to a boost converter control 106 that provides a boost control signal to the boost switch 108 to implement boost voltage regulation.

Since the first feedback loop does not regulate the current $I_{LED}$ through the LED channel 104, a current regulation device 218 is coupled between the LED channel 104 and ground. A sense resistor 114 is coupled between the current regulation device 119 (e.g., a linear switch or transistor) and ground. A signal from a regulator 118 is applied to the regulation device to control the LED current. The regulator 118 may be a comparator that receives a control input, e.g., a voltage that corresponds to the channel current $I_{LED}$. The control input may be in the form of a voltage $V_{CTRL}$ measured at a node 216 between the regulation device 119 and a sense resistor R coupled to ground, where $V_{CTRL}=R*I_{LED}$. The regulator 118 may compare the control input to a second control input that corresponds to a desired value for the channel current $I_{LED}$.

In the system 200, because current is regulated independently of voltage, this system also can be used for multi-channel configuration, i.e., it is used to match the current of each LED channel. FIG. 3 is a schematic diagram of another conventional system 300, similar to the one in FIG. 2, capable of regulating multiple channels/strings of LEDs. Unfortunately, there are similar cost issues with the system 200 of FIG. 2 as with the system 100 of FIG. 1 that make such a system undesirably expensive for multi-channel implementations. The cost of such a system is partly driven by the cost of implementing the LED current regulator in silicon using a traditional IC process and engineering design resources. In addition, the LED current regulator device 119 typically operates in a linear region, which is not as efficient as an on-off switch in terms of power consumption and device size. Although a multi-channel version of the system 200 does not need multiple boost converters or multiple boost switches to regulate multiple parallel channels, such a system would require multiple regulators and multiple current regulation devices.

Figure 3:
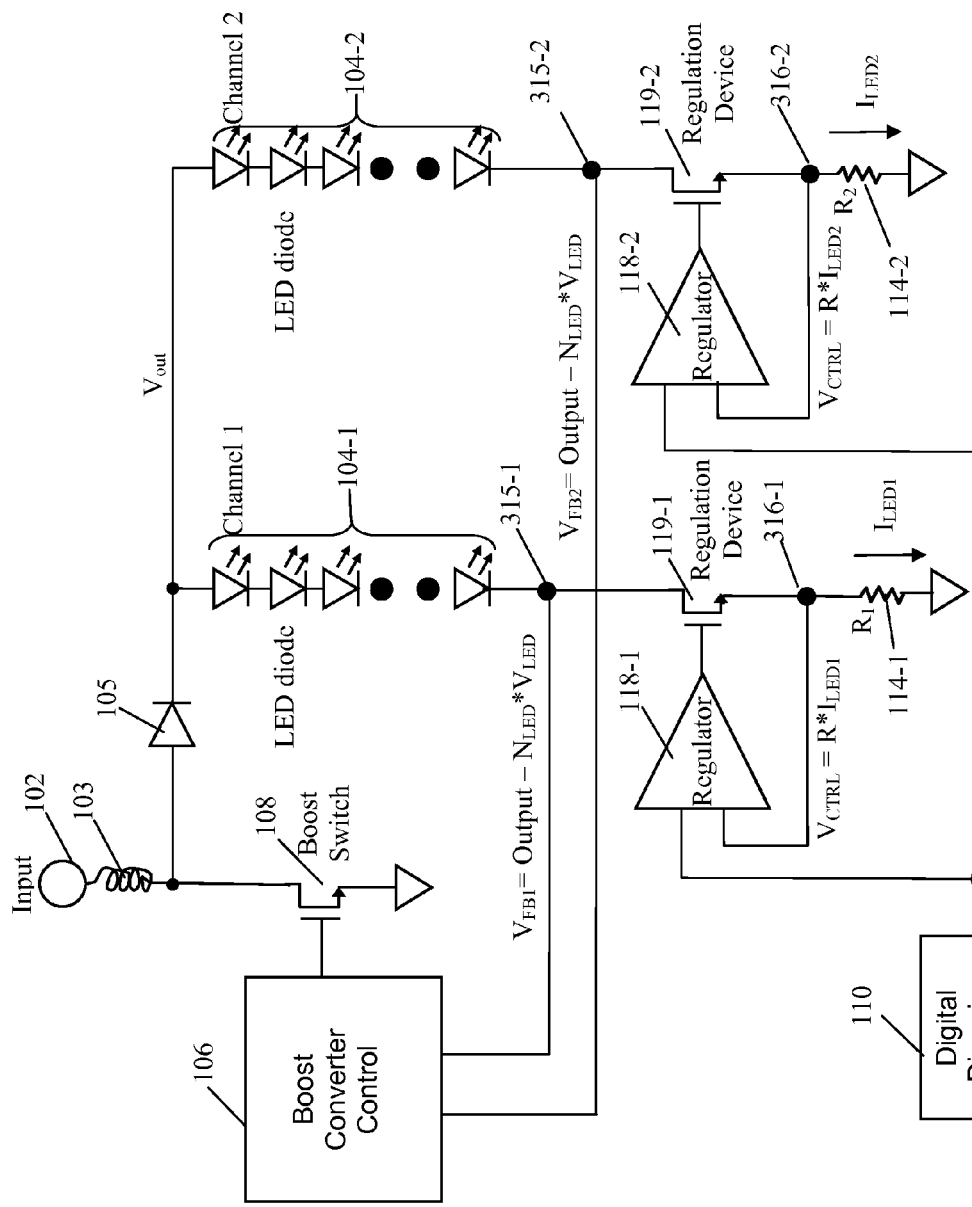
FIG. 3 is a schematic diagram of yet another conventional system, similar to the one in FIG. 2, capable of regulating multiple channels/strings of LEDs.

FIG. 3 depicts a multi-channel LED control system 300. Similar to system 200, system 300 may include a power source 102 coupled to multiple parallel channels of LEDs 104, for a simplicity, only two channels 104-1 and 104-2 are shown in FIG. 3. A power source 102 is coupled to a multiple parallel channels of LEDs through an inductor 103 and a Schottky diode 105 to provide an output voltage $V_{OUT}$. The power source 102 also is coupled through a boost switch 108 to ground or some other voltage reference. A boost converter control 106 provides a signal that controls the boost switch 108.

The system 300 implements a first control loop to regulate the LED bias voltage $V_{LED}$ at the node 315-1. A feedback circuit is formed by coupling a feedback voltage $V_{FB}$ from node 315-1 back to the boost converter control 106. Again, assuming each LED in channel 104-1 has the same voltage drop, $V_{FB1}=V_{OUT}-V_{LED}*N_{LED}$, where $N_{LED}$ is the number of LED in the first channel 104-1. The system 300 also implements a second control loop to regulate the LED bias voltage $V_{LED}$ at the node 315-2. A feedback circuit is formed by coupling the feedback voltage $V_{FB2}$ at node 315-2 back to the boost converter control 106 as a feedback voltage $V_{FB2}$ ($V_{FB2}=V_{OUT}-V_{LED}*N_{LED}$), where $N_{LED}$ is the number of LED in the second LED channel 104-2. The boost voltage is regulated by the lowest feedback voltage, $VF_{B1}$ or $VF_{B2}$, which corresponds to the LED channel having the highest voltage drop across it.

Similar to system 200, system 300 further includes current regulators 118-1 and 118-2 to control the LED current, which are used between the cathode of the lowest LED diodes in the channels 104-1 and 104-2 respectively to ground. In system 300, the digital dimming control 110 is coupled to the regulators 118-1 and 118-2. Third and fourth control loops are implemented to independently regulate the LED currents ($I_{LED1}$ and $I_{LED2}$) at the node 316-1 and node 316-2 respectively. Typically, a feedback circuit is formed by coupling the LED current $I_{LED1}$ (node 316-1) back to the regulator 118-1 as a control voltage $V_{CTRL}$ ($V_{CTRL}=R*I_{LED1}$) to implement current regulation through a regulation device 119-1 and a feedback circuit is formed by coupling the LED current $I_{LED2}$ (node 316-2) back to the regulator 118-2 as a control voltage $V_{CTRL}$ ($V_{CTRL}=R*I_{LED2}$) to implement current regulation through a regulation device 119-2. This method is a more costly solution due to the use of multiple regulators and regulation devices. The system 300 in the example depicted in FIG. 3 requires one inductor, one boost switch, two regulators and two regulation devices for 2 channels system. Beside, power is wasted for the channels other than the one with the lowest LED forward voltage. Specifically, since the voltage is regulated based on the channel having the lowest feedback voltage the channels with higher feedback voltages will have power lost to dissipation as heat in their regulation devices.

Solution

System 100 of FIG. 1 is the most cost efficient solution for LED backlight. However, the cost efficiency diminishes for more than one channel due to duplicate boost or buck converter elements. Embodiments of the present invention system adapt an LED control system like the system 100 for control of multiple channels with single boost converter element.

Specifically, the drawbacks associated with prior art LED controls may be avoided by controlling parallel light emitting diode channels may be controlled using a pulsed control signal input characterized by an input duty cycle and one or more current sense input signals. Each current sense input signal is indicative of a current through a corresponding LED channel. One or more pulsed channel current control signals can be provided to one or more corresponding dimming controls correspondingly coupled to the one or more LED channels. Each of the dimming controls is configured to provide an output signal to a corresponding ON-OFF switch, each of which is coupled in series with a corresponding the LED channels. The channel duty cycle of each channel current control signal is adjusted relative to the input duty cycle in response to the current sense input signals.

By using ON-OFF switches and dimming controls instead of linear switches and regulators the cost of the control system can be significantly reduced.

Embodiment

Figure 4:
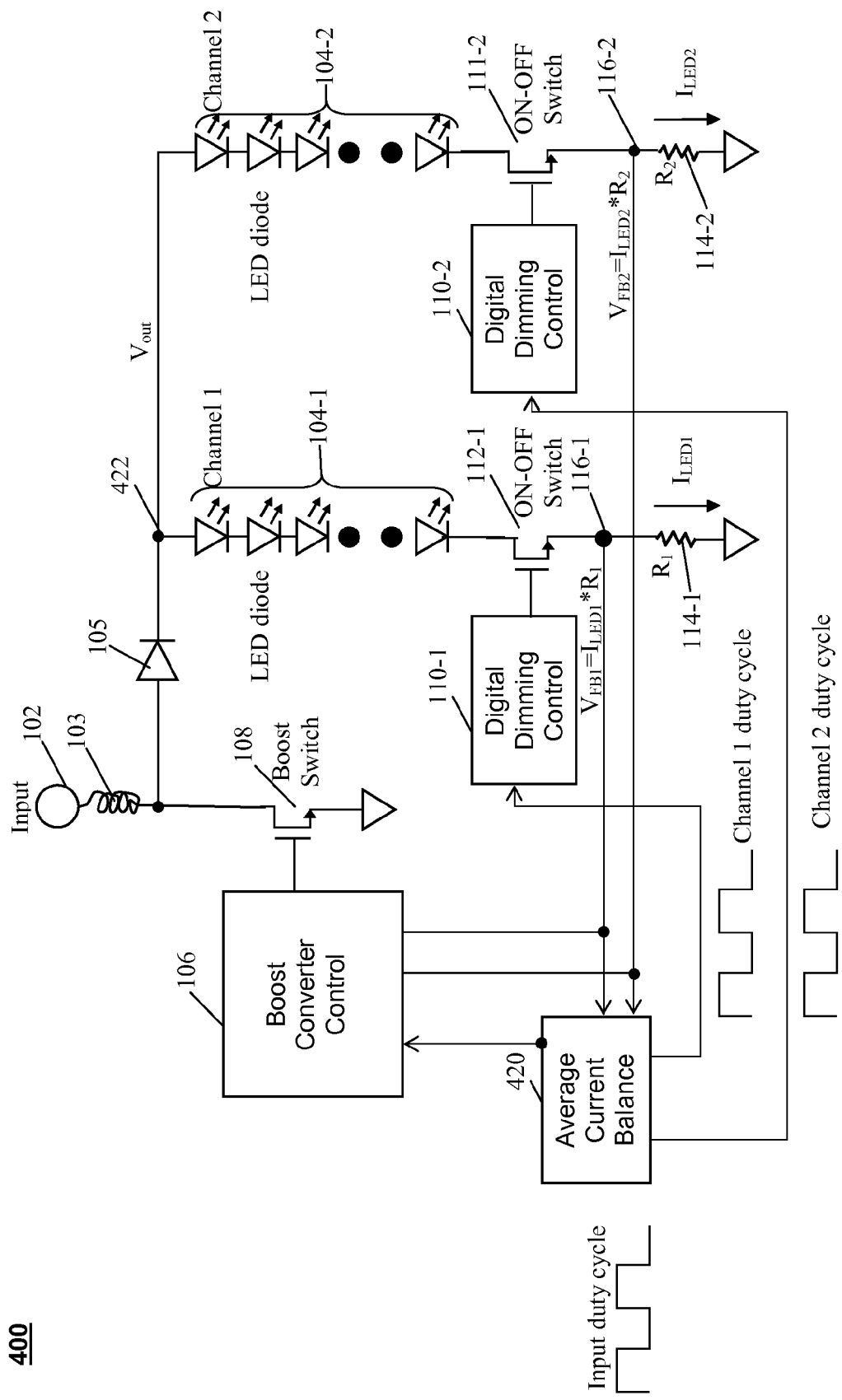
FIG. 4 is a schematic diagram of a system capable of regulating a single LED channel or multiple channels of LEDs with a single boost converter according to an embodiment of the present invention.

FIG. 4 is a schematic diagram of a system 400 capable of regulating multiple channels of LEDs with a single boost converter, resulting in cost efficiency, according to an embodiment of the present invention.

In the system 400 multiple parallel channels of LEDs may be coupled to the power source 102 via a Schottky diode 105 and inductor 103. The voltage across each channel is the output voltage $V_{out}$ at the cathode of the Schottky diode 105. In the example, depicted in FIG. 4, two LED channels 104-1, 104-2 are shown; however, embodiments of the invention may be implemented with any number of LED channels. The voltage drop across each individual LED channel may vary with the individual characteristics of the LEDs, such that the different LED channels may have different activation voltages. For simplicity, system 400 only shows two channels of LEDs 104-1 and 104-2. The power source 102 also is coupled to a Boost Converter Control 106 through a boost switch 108. Similar to system 100, each digital dimming control 110-1, 110-2 is coupled to a corresponding LED channel 104-1, 104-2 through an ON-OFF switch 112-1, 112-2 and a current sense resistor 114-1, 114-2 located between the ON-OFF switch 112-1, 112-2 and ground or some other voltage reference.

As shown in FIG. 4, each digital dimming control 110-1, 110-2 provides a control signal to it corresponding ON-OFF switch 112-1, 112-2 to control the current $I_{LED1}$, $I_{LED2}$ through the corresponding LED channel 104-1, 104-2 by pulse width modulation.

The system 400 implements separate feedback loops to regulate the output voltage $V_{OUT}$ and the average current of the channels 104-1, 104-2 in response to sense signals corresponding to the instantaneous currents $I_{LED1}$, $I_{LED2}$ through LED channels 104-1, 104-2. By way of example, and not by way of limitation, the sense signals may be in the form of feedback signals $V_{FB1}$, $V_{FB2}$ measured at nodes 116-1 and 116-2 between sense resistors 114-1, 114-2 and ON-OFF switches 112-1, 112-2. The feedback voltages $V_{FB1}$, $V_{FB2}$ may be expressed as $V_{FB1}=R_1*I_{LED1}$ and $V_{FB2}=R_2*I_{LED2}$. Similar to system 300, output voltage control feedback loops for the LED channels 104-1, 104-2 may be formed by coupling the feedback voltages $V_{FB1}$, $V_{FB2}$ to the boost converter control 106. The boost converter control 106 may choose the lowest feedback voltage of $V_{FB1}$, $V_{FB2}$ to regulate the output voltage $V_{OUT}$ as this is the minimum output voltage required to keep channel on.

The system 400 further includes an Average Current Balance Element 420 coupled to the digital dimming controls 110-1, 110-2 and to the Boost converter control 106. In this method, the average current for each channel 104-1, 104-2 is regulated instead of the instantaneous current, as in the system 300. The average current balance element 420 is configured to receive a pulsed control signal input characterized by an input duty cycle and current sense input signals corresponding to the current through each LED channel 104-1, 104-2. By way of example, and not by way of limitation, the current sense signals may be the feedback voltages $V_{FB1}$, $V_{FB2}$ or signals derived from them. The average current balance element is further configured to provide pulsed channel current control signals to the digital dimming controls 110-1, 110-2. The average current balance element 420 is configured to adjust the channel duty cycle of each channel current control signal relative to the input duty cycle in response to the one or more current sense input signals (e.g., in response to $V_{FB1}$ and $V_{FB2}$).

Figure 7:
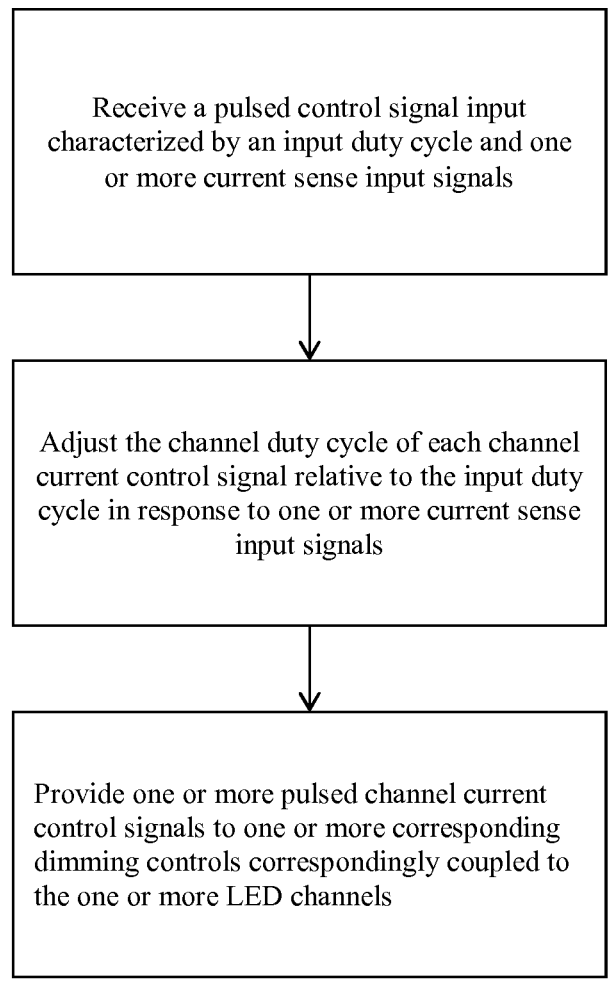
FIG. 7 is a diagram showing the functions that an average current balance element is configured to perform according to one embodiment of the present disclosure.

By way of example, and not by way of limitation, the Average current balance element 420 may be implemented in software in a programmable device, such as a microprocessor or in hardware, such as an application specific integrated circuit ASIC, or a microcontroller. FIG. 7 is a diagram showing the functions that an average current balance element 420 is configured to perform.

To control the average current through each LED channel 104-1, 104-2, the average current balance element 420 provides separate pulse width modulation inputs to the digital dimming controls 110-1, 110-2 to achieve the same average current $I_{LED1}$ for each LED channel with the same output voltage $V_{OUT}$ at the anode of the top LED diode (node 422) for all channels. Average Current Balance element 420 uses the current information to determine the channel with the lowest LED current. This channel will provide feedback signal for boost converter regulation. The ON-OFF switch duty cycle for the channel with the lowest LED current will be the same as the input PWM dimming duty cycle. All other channels with higher LED current will have the ON-OFF switch duty cycle adjusted by the difference of LED current. The channel duty cycle for LED channels having higher LED channel currents $I_{LED}$ (higher) than the lowest LED channel current $I_{LED}$(lowest) may be expressed by the following equation:

Channel duty cycle=$[I_{LED}$(lowest)*Input Duty Cycle$]/I_{LED}$(higher)].

By way of numerical example, assume the two channels 104-1, 104-2 are 10% mismatched. With the same output voltage $V_{OUT}$ at anode of the top LED diode (node 422), if the full current $I_{LED1}$ of channel 104-1 is 100 mA, due to the 10% mismatch, the full current of channel 104-2 would be 110 mA. Therefore, the feedback voltage $V_{FB1}$ of channel 104-1 would be 500 mV and the feedback voltage $V_{FB2}$ of channel 104-2 would be 550 mV due to LED 10% mismatch. For the sake of example it is assumed that $R_1=R_2$.

The boost converter control 106 will choose the lowest feedback voltage, in this example $V_{FB1}$ of 500 mV to regulate the output voltage $V_{OUT}$ as this is the minimum output voltage required to keep LED channel 104-1 on.

Assume the input duty cycle is 50%. If the same duty cycle were applied to the digital dimming controls, the resulting average currents would be 50 mA for the first channel 104-1 and 55 mA for the second channel 104-2. The Average Current Balance 420 adjusts the duty cycle for the second LED channel 104-2 from 50% to 45.4% so that the average current $I_{LED2}$ for the second channel is 50 mA (110 mA*0.454=50 mA).

Figure 5:
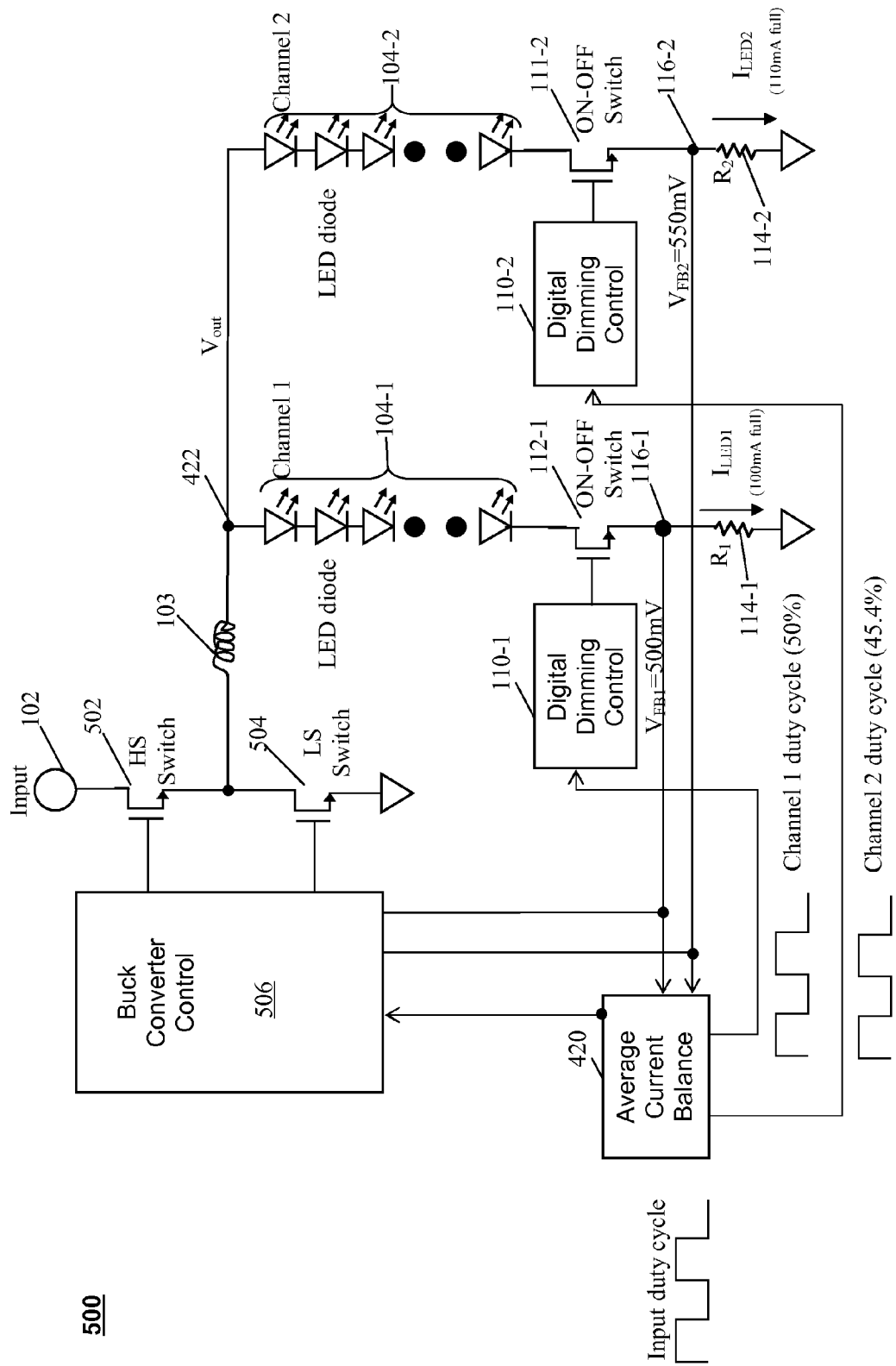
FIG. 5 is a schematic diagram of a system capable of regulating a single LED channel or multiple channels of LEDs with a single buck converter according to another embodiment of the present invention.

Embodiments of the present invention are not limited to implementations that utilize a boost converter. In alternative embodiments, a single buck converter may be used in an LED drive to step down an input voltage. By way of example, and not by way of limitation, FIG. 5 is a schematic diagram of a system 500 capable of regulating multiple channels of LEDs with a single buck converter, resulting in cost efficiency, according to an embodiment of the present invention.

The system 500 is basically similar to system 400 except that a boost converter control is replaced with a buck converter control. The illustrated system 500 is a synchronous buck configuration, which includes a high-side (HS) switch 502 and a low-side (LS) switch 504 electrically coupled to the Buck Converter Control 506. The HS and LS switches can be suitable transistors, e.g., MOSFET, IGBT or BJT.

In the system 500 multiple parallel channels of LEDs may be coupled to the power source 102 via an inductor 103 and the HS switch 502 or the LS switch 504. The voltage across each channel is the output voltage $V_{out}$ cross the inductor 103. In the example, depicted in FIG. 5, two LED channels 104-1, 104-2 are shown; however, embodiments of the invention may be implemented with any number of LED channels. The voltage drop across each individual LED channel may vary with the individual characteristics of the LEDs, such that the different LED channels may have different activation voltages. For simplicity, system 500 only shows two channels of LEDs 104-1 and 104-2. The power source 102 also is coupled to the Buck Converter Control 506 through the HS switch 502 and LS switch 504. Similar to system 400, each digital dimming control 110-1, 110-2 is coupled to a corresponding LED channel 104-1, 104-2 through an ON-OFF switch 112-1, 112-2 and a current sense resistor 114-1, 114-2 located between the ON-OFF switch 112-1, 112-2 and ground or some other voltage reference. Each digital dimming control 110-1, 110-2 provides a control signal to it corresponding ON-OFF switch 112-1, 112-2 to control the current $I_{LED1}$, $I_{LED2}$ through the corresponding LED channel 104-1, 104-2 by pulse width modulation.

Similar to system 400, the system 500 implements separate feedback loops to regulate the output voltage $V_{OUT}$ and the average current of the channels 104-1, 104-2 in response to sense signals corresponding to the instantaneous currents $I_{LED1}$, $I_{LED2}$ through LED channels 104-1, 104-2 as described above. The buck converter control 506 may choose the lowest feedback voltage of $V_{FB1}$, $V_{FB2}$ to regulate the output voltage $V_{OUT}$ as this is the minimum output voltage required to keep channel on. The system 500 further includes an Average Current Balance Element 420 coupled to the digital dimming controls 110-1, 110-2 and to the Buck converter control 506. The average current for each channel 104-1, 104-2 is regulated instead of the instantaneous current, as in the system 300. The average current balance element 420 is configured to receive a pulsed control signal input characterized by an input duty cycle and current sense input signals corresponding to the current through each LED channel 104-1, 104-2. By way of example, and not by way of limitation, the current sense signals may be the feedback voltages $V_{FB1}$, $V_{FB2}$ or signals derived from them. The average current balance element is further configured to provide pulsed channel current control signals to the digital dimming controls 110-1, 110-2. The average current balance element 420 is configured to adjust the channel duty cycle of each channel current control signal relative to the input duty cycle in response to the one or more current sense input signals (e.g., in response to $V_{FB1}$ and $V_{FB2}$).

When the HS switch is closed (ON state), thus the LS switch is opened (OFF state), the voltage across the inductor 103 is $V_L=V_{in}-V_{out}$. The current through the inductor 103 rises linearly. As the LS switch is OFF, no current flows through it. As describe above, to control the average current through each LED channel 104-1, 104-2, the average current element balance 420 provides separate pulse width modulation inputs to the digital dimming controls 110-1, 110-2 to achieve the same average current $I_{LED1}$ for each LED channel with the same output voltage $V_{OUT}$ at the anode of the top LED diode (node 422) for all channels. Average Current Balance 420 uses the current information to determine the channel with the lowest LED current. This channel will provide feedback signal for buck converter regulation. The ON-OFF switch duty cycle for the channel with the lowest LED current will be the same as the input PWM dimming duty cycle. All other channels with higher LED current will have the ON-OFF switch duty cycle adjusted by the difference of LED current. The channel duty cycle for LED channels having higher LED channel currents $I_{LED}$ (higher) than the lowest LED channel current $I_{LED}$(lowest) may be expressed by the following equation:

Channel duty cycle=[$I_{LED}$(lowest)*Input Duty Cycle]/$I_{LED}$(higher)].

By way of numerical example, assume the two channels 104-1, 104-2 are 10% mismatched. With the same output voltage $V_{OUT}$ at anode of the top LED diode (node 422), if the full current $I_{LED1}$ of channel 104-1 is 100 mA, due to the 10% mismatch, the full current of channel 104-2 would be 110 mA. Therefore, the feedback voltage $V_{FB1}$ of channel 104-1 would be 500 mV and the feedback voltage $V_{FB2}$ of channel 104-2 would be 550 mV due to LED 10% mismatch. For the sake of example it is assumed that $R_1=R_2$.

The buck converter control 506 will choose the lowest feedback voltage, in this example $V_{FB1}$ of 500 mV to regulate the output voltage $V_{OUT}$ as this is the minimum output voltage required to keep LED channel 104-1 on.

Assume the input duty cycle is 50%. If the same duty cycle were applied to the digital dimming controls, the resulting average currents would be 50 mA for the first channel 104-1 and 55 mA for the second channel 104-2. The Average Current Balance 420 adjusts the duty cycle for the second LED channel 104-2 from 50% to 45.4% so that the average current $I_{LED2}$ for the second channel is 50 mA (110 mA*0.454=50 mA).

When the HS switch is opened (OFF state), thus the LS switch is closed (ON state), the voltage across the inductor 103 is $V_L=-V_{out}$ (neglecting diode drop). Thus, Current $I_L$ though the inductor 103 decreases.

Figure 6:
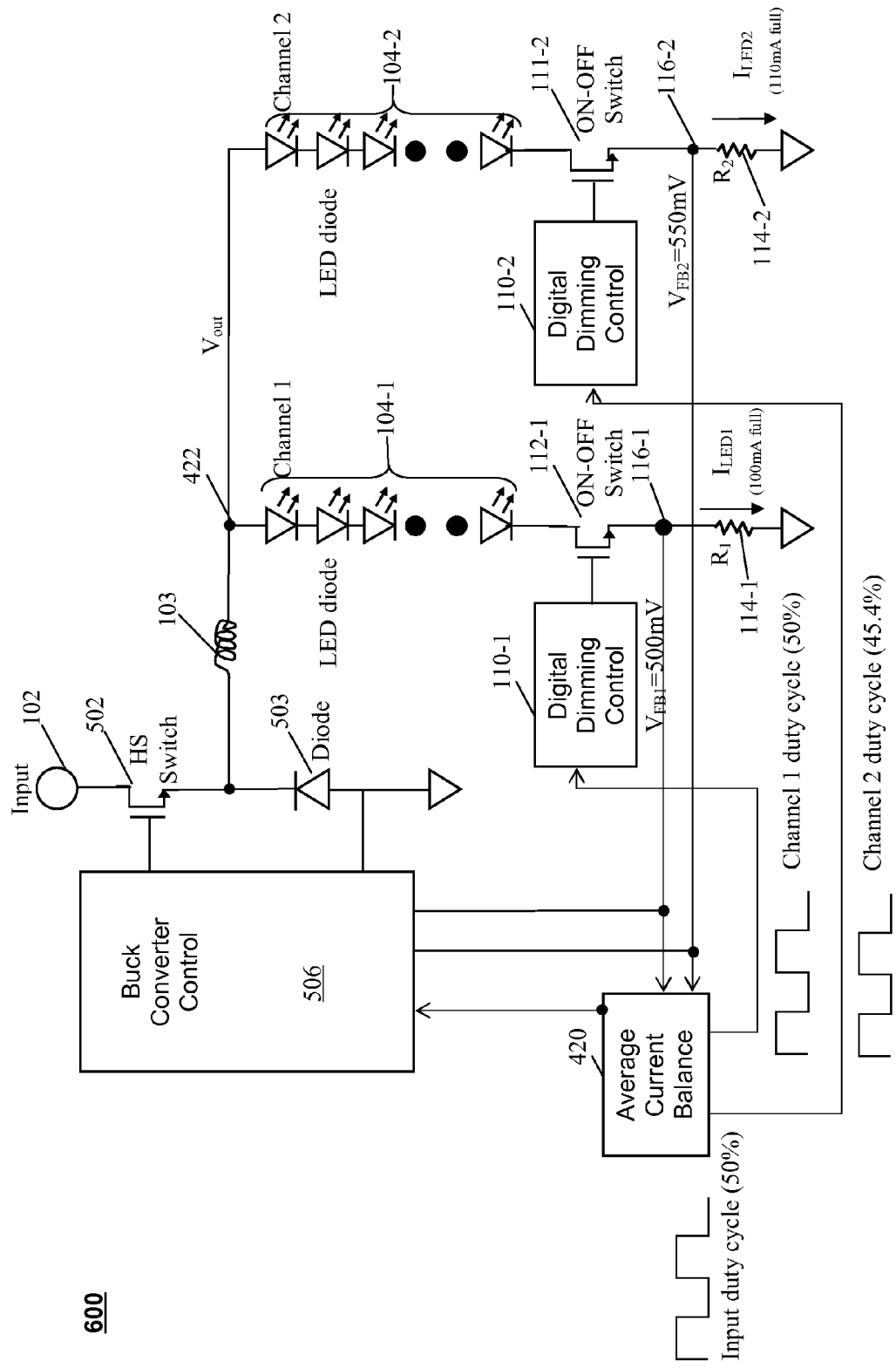
FIG. 6 is a schematic diagram of a system capable of regulating a single LED channel or multiple channels of LEDs with a single buck converter according to alternative embodiment of the present invention.

FIG. 6 is a schematic diagram of a system 600 capable of regulating multiple channels of LEDs with single buck converter, resulting in cost efficiency, according to another embodiment of the present invention. System 600 is similar to system 500 except that the system 600 is a non-synchronous buck configuration, which includes a high-side (HS) switch 502 and a diode 503 electrically coupled to the Buck Converter Control 506 and a diode 503. The HS switch can be a suitable transistor, such as a MOSFET, IGBT or BJT. The diode is configured to be reverse biased when the HS switch 502 is closed and forward biased when the HS switch 502 is open. As is common in non-synchronous buck converters, the voltage across the parallel LED channels 104-1, 104-2 depends on the duty cycle of the switch signal that turns the HS switch 502 on and off.

In the system 600 multiple parallel channels of LEDs may be coupled to the power source 102 via an inductor 103 and the HS switch 502 or the diode 503. The voltage across each channel is the output voltage $V_{out}$ across the inductor 103. The power source 102 also is coupled to the Buck Converter Control 506 through the HS switch 502 and the diode 503.

System 600 basically operates similar to system 500. When the HS switch 502 is closed (ON state) the voltage across the inductor 103 is $V_L = V_{in} - V_{out}$. The current through the inductor 103 rises linearly. As the diode 503 is reverse-biased by the voltage source V, no current flows through it. When the HS switch 502 is opened (OFF state), the diode 503 is forward biased, the voltage across the inductor 103 is $V_L = -V_{out}$ (neglecting diode drop). Thus, Current $I_L$ though the inductor 103 decreases. This technique for current control avoids power loss in channels having higher currents and reduces cost for the system by avoiding using expensive regulators and regulation devices, as in the system 300 of FIG. 3. Although examples are described in terms of LED channels for backlights, those skilled in the art will recognize that embodiments of the present invention are not limited to such implementations. Alternatively, embodiments of the present invention may be employed in other applications where it is desirable to control the current in multiple parallel channels. In principle, embodiments of the present invention may be applied to any type of device that uses pulse width modulation to regulate average DC current in one or more load channels. Such, devices may include, e.g., motor drives.

While the above is a complete description of the preferred embodiments of the present invention, it is possible to use various alternatives, modifications, and equivalents. Therefore, the scope of the present invention should be determined not with reference to the above description but should, instead, be determined with reference to the appended claims, along with their full scope of equivalents. Any feature, whether preferred or not, may be combined with any other feature, whether preferred or not. In the claims that follow, the indefinite article "A" or "An" refers to a quantity of one or more of the item following the article, except where expressly stated otherwise. The appended claims are not to be interpreted as including means-plus-function limitations, unless such a limitation is explicitly recited in a given claim using the phrase "means for". Any element in a claim that does not explicitly state "means for" performing a specified function, is not to be interpreted as a "means" or "step" clause as specified in 35 USC §112, ¶6.

What is claimed is:

1. A light emitting diode (LED) control system, comprising:
   two or more digital dimming controls, each of which is configured to receive a corresponding one of two or more pulsed channel current control signals, wherein each of the two or more pulsed channel current control signals is characterized by a corresponding channel duty cycle, wherein each of the two or more dimming controls is configured to provide an output signal directly coupled to a corresponding one of two or more ON-OFF switches without passing the output signal through a regulator, wherein each of said two or more ON-OFF switches is coupled in series with a corresponding one of a plurality of parallel LED channels; and
   an average current balance element having circuitry configured to receive a pulsed control signal input characterized by an input duty cycle and two or more current sense input signals, wherein each of the two or more current sense input signals is indicative of a current through a corresponding one of the plurality of parallel LED channels, wherein the circuitry is further configured to provide the two or more pulsed channel current control signals to corresponding ones of the two or more digital dimming controls, wherein the circuitry is additionally configured to adjust the channel duty cycle of each of the two or more pulsed channel current control signals relative to the input duty cycle in response to the two or more current sense input signals.

2. The system of claim 1 wherein a particular channel with a lowest LED current has a channel duty cycle equal to the input duty cycle.

3. The system of claim 2 wherein each of the plurality of LED channels having a higher LED current than the lowest LED current has a channel duty cycle lower than the input duty cycle.

4. The system of claim 3, wherein the channel duty cycle for a given LED channel other than the particular LED channel having the lowest LED current is equal to a product of the input duty cycle and a ratio of the lowest LED channel current to a channel current for the given channel.

5. The system of claim 2, wherein each of the two or more ON-OFF switches is coupled between a corresponding sense resistor and one end of a corresponding LED channel that is coupled to the corresponding sense resistor.

6. The system of claim 1, further comprising a single boost converter element configured to sense a channel current through each of the plurality of parallel LED channels and regulate a drive voltage supplied to the parallel LED channels.

7. The system of claim 6, wherein the boost converter is configured to receive the two or more current sense input signals, determine a boost switch signal from the two or more current sense input signals, and provide the boost switch signal to a boost switch that is configured to regulate the drive voltage by regulating a current through the boost switch.

8. The system of claim 7, further comprising a boost switch, wherein the boost switch is coupled between a node and a voltage reference, where the node is coupled to an input side of the plurality of parallel LED channels.

9. The system of claim 8, further comprising an inductor, wherein the inductor is coupled between the node and a source of input voltage.

10. The system of claim 1, further comprising a single buck converter element configured to sense a channel current through each of the plurality of parallel LED channels and provide two or more switch signals to two or more switches that regulate a drive voltage supplied to the plurality of parallel LED channels.

11. The system of claim 10, wherein the buck converter is a synchronous buck converter configured to receive the two or more current sense input signals, determine a high-side switch signal and a low side switch signal from the two or more current sense input signals, and provide the high-side switch signal to a high-side switch coupled between a voltage source and a node and the low-side signal to a low-side switch coupled between the node and a reference voltage.

12. The system of claim 11, further comprising the high side switch and the low side switch.

13. The system of claim 12, further comprising an inductor, wherein the inductor is coupled between the node and the plurality of parallel LED channels.

14. The system of claim 10, wherein the buck converter is a non-synchronous buck converter configured to receive the two or more current sense input signals, determine a high-side switch signal and provide the high-side switch signal to a high-side switch coupled between a voltage source and a node that is connected to the plurality of LED channels through an inductor.

15. The system of claim 14, further comprising a diode coupled between the node and a reference voltage, wherein the diode is configured to be reverse biased when the high-side switch is open.

16. A current control system, comprising:
an average current balance element having circuitry configured to receive a pulsed control signal input characterized by an input duty cycle and two or more current sense input signals, wherein each of the two or more current sense input signals is indicative of a current through a corresponding load channel of a plurality of load channels, wherein the average current balance element is configured to provide two or more pulsed channel current control signals to two or more corresponding dimming controls correspondingly directly coupled to the plurality of load channels without passing the two or more pulsed channel current control signals through a regulator, wherein the average current balance element is configured to adjust a channel duty cycle of each of the two or more pulsed channel current control signals relative to the input duty cycle in response to the two or more current sense input signals.

17. A light emitting diode (LED) control method, comprising:
receiving, by an average current balance element, a pulsed control signal input characterized by an input duty cycle and two or more current sense input signals, wherein each of the two or more current sense input signals is indicative of a current through a corresponding LED channel of a plurality of LED channels;
providing, by the average current balance element, two or more pulsed channel current control signals to two or more corresponding dimming controls correspondingly coupled to the plurality of LED channels, wherein each of the two or more dimming controls is configured to provide an output signal directly coupled to a corresponding one of two or more ON-OFF switches without passing the output signal through a regulator, each of which is coupled in series with a corresponding one of the plurality of LED channels; and
adjusting, by the average current balance element, a channel duty cycle of each channel current control signal relative to the input duty cycle in response to the two or more current sense input signals.

18. The method of claim 17, further comprising using the two or more current sense input signals to determine a particular channel of the plurality of LED channels having a lowest LED current and provide a feedback signal to a boost or buck converter element configured to regulate a voltage across the plurality of LED channels.

19. The method of claim 18 wherein the particular channel with the lowest LED current has a channel duty cycle equal to the input duty cycle.

20. The method of claim 19, wherein each of the plurality of LED channels having a higher LED current than the lowest LED current has a channel duty cycle lower than the input duty cycle.

21. The method of claim 20, wherein a given LED channel other than the particular LED channel having the lowest LED current has a channel duty cycle equal to a product of the input duty cycle and a ratio of the lowest LED channel current to a channel current for the given channel.

22. The method of claim 18, wherein the boost or buck converter element is configured to sense a channel current through each of the plurality of LED channels and regulate a drive voltage supplied to the plurality of LED channels.

23. The method of claim 22, wherein the boost or buck converter is configured to receive the two or more current sense input signals, determine two or more switch signals from the two or more current sense input signals, and provide two or more switch signals to two or more switches that are configured to regulate the drive voltage by regulating a current through the two or more switches.

* * * * *